United States Patent [19]
Liebig et al.

[11] Patent Number: 5,840,130
[45] Date of Patent: Nov. 24, 1998

[54] CLEANING OF THE WATER/STEAM CIRCUIT IN A ONCE-THROUGH FORCED-FLOW STEAM GENERATOR

[75] Inventors: Erhard Liebig, Ditzingen, Germany; Christoph Ruchti, Uster, Switzerland

[73] Assignee: Asea Brown Boveri AG, Baden, Switzerland

[21] Appl. No.: 747,404

[22] Filed: Nov. 12, 1996

[30] Foreign Application Priority Data

Nov. 28, 1995 [DE] Germany .................. 195 44 225.3

[51] Int. Cl.⁶ .................. B08B 9/00; F22B 37/18; F22B 37/48
[52] U.S. Cl. .................. 134/22.15; 122/379; 165/84; 165/95
[58] Field of Search .................. 134/22.15; 122/379; 165/84, 95

[56] References Cited

U.S. PATENT DOCUMENTS

| | | | |
|---|---|---|---|
| 4,466,383 | 8/1984 | Klatt et al. | 122/379 |
| 4,831,969 | 5/1989 | Vollhardt et al. | 122/379 |
| 4,836,146 | 6/1989 | Russell et al. | 122/379 |

FOREIGN PATENT DOCUMENTS

| | | |
|---|---|---|
| 0155568A2 | 9/1985 | European Pat. Off. . |
| 0 359735 | 3/1990 | European Pat. Off. . |
| 0 561 220 A1 | 3/1993 | European Pat. Off. . |
| 0579061A1 | 1/1994 | European Pat. Off. . |
| 2516643 | 5/1983 | France . |
| 809 199 | 4/1952 | Germany . |
| 1 000 828 | 1/1957 | Germany . |
| 2631180 | 1/1978 | Germany . |
| 4126631A1 | 2/1993 | Germany . |
| 43 03 613 A1 | 8/1994 | Germany . |
| 322 434 | 7/1957 | Switzerland . |
| 431 241 | 7/1935 | United Kingdom . |
| 1315806 | 5/1973 | United Kingdom . |

*Primary Examiner*—Kriellion S. Morgan
*Attorney, Agent, or Firm*—Burns, Doane, Swecker & Mathis, L.L.P.

[57] ABSTRACT

In a combined gas/steam power plant with a once-through forced-flow steam generator, a separation bottle (25) is connected between the evaporator (22) and the superheater (23). To clean the water/steam circuit, in the full-load or the part-load mode, a larger quantity of water than necessary is conveyed through the economizer (21) and the evaporator (22) via a feed pump (20). The quantity of water is selected such that wet steam passes into the separation bottle (25). This water fraction, together with all the impurities contained therein, is separated in the separation bottle and is drawn off via a clarifying line (29). Overfeeding can be regulated in such a way that the fresh steam temperature corresponds to the nominal value of the respective load point. When cleaning of the water/steam circuit is intended in the full-load mode, and without overfeeding the system, steam from a stage of incomplete evaporation can be extracted out of the evaporator and led into the separation bottle. During cold starting, the supercooled water passing via the evaporator (22) into the separation bottle (25) and, later, the water separated from the generated wet steam, are discarded via the clarifying line (29) until the desired purity in the water/steam circuit is reached.

8 Claims, 1 Drawing Sheet

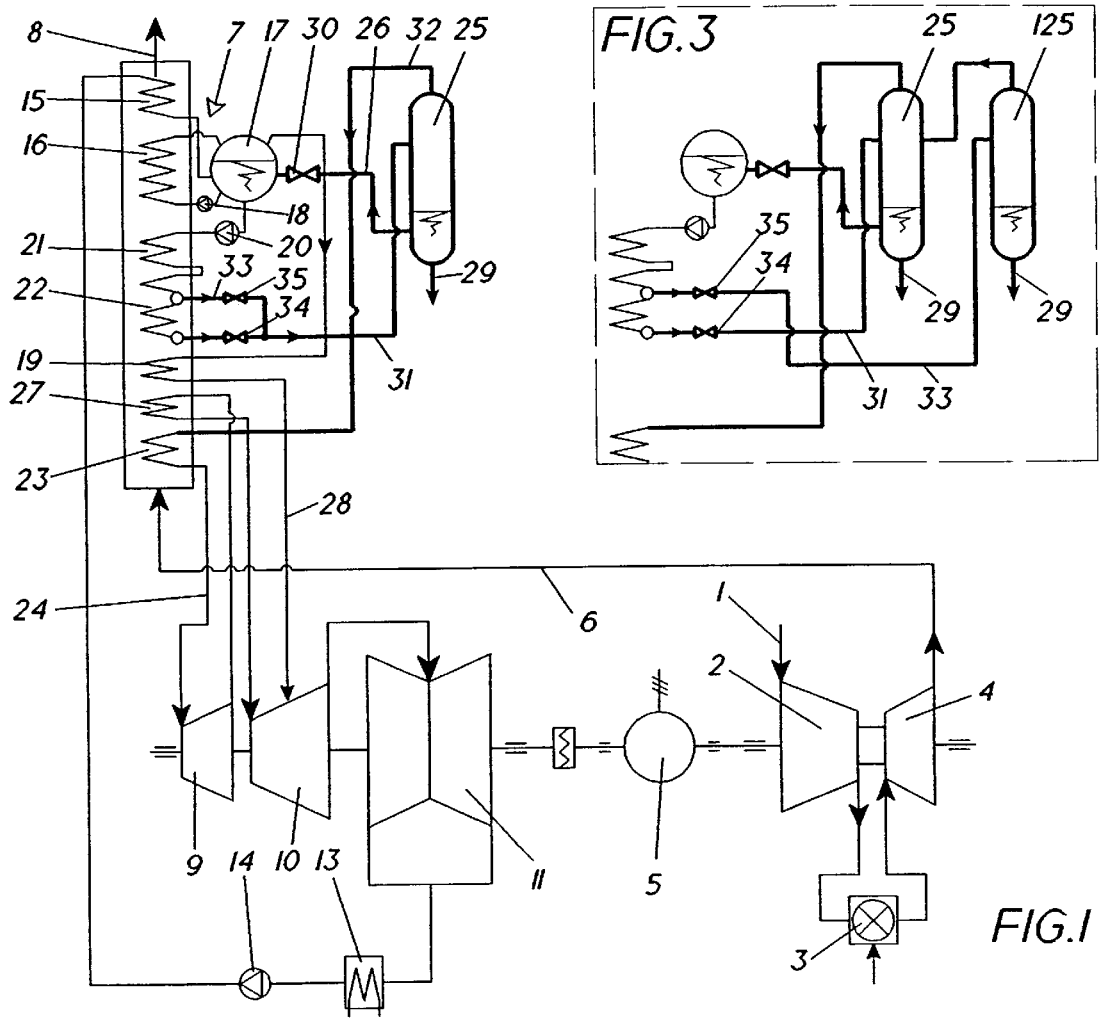
FIG.3
FIG.1
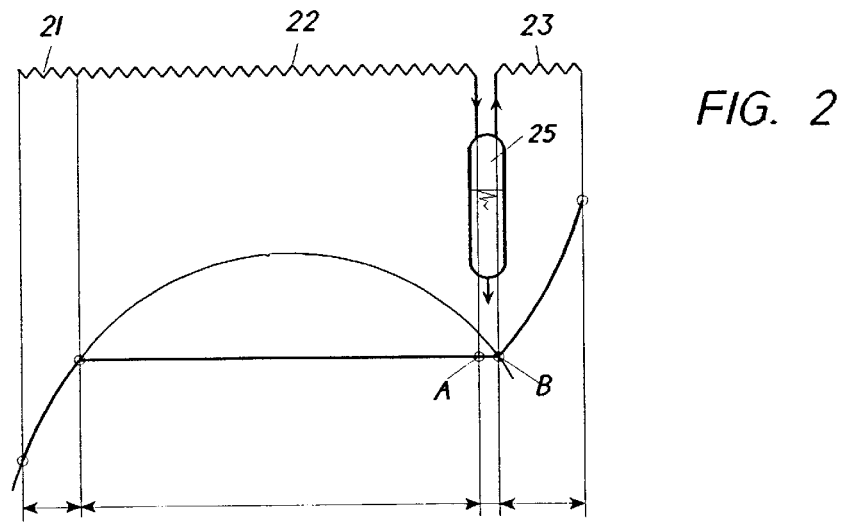
FIG. 2

CLEANING OF THE WATER/STEAM CIRCUIT IN A ONCE-THROUGH FORCED-FLOW STEAM GENERATOR

BACKGROUND OF THE INVENTION

1. Field of the Invention

The invention relates to a method for cleaning the water/steam circuit of a combined gas/steam power plant which has a gas turbine circuit and a steam turbine circuit, the waste gases from a gas turbine transmitting their residual heat to a steam turbine via the working medium flowing in a once-through forced-flow steam generator, the once-through forced-flow steam generator being composed essentially of an economizer, of an evaporator and of a superheater, and a separation bottle being connected between the evaporator and the superheater.

2. Discussion of Background

Waste-heat boilers for utilizing the waste heat from gas turbine plants are designed, as a rule, with drum boilers. The water/steam circuit is cleaned by upgrading in the respective drum and by continuous or discontinuous clarification of the drum.

However, if the waste-heat boilers are provided with a once-through forced-flow boiler, this cleaning mechanism does not apply. In this case, the cleaning of the water/steam circuit is carried out in a condensate purification plant.

SUMMARY OF THE INVENTION

Accordingly, one object of the invention is to provide a novel plant of the type initially mentioned, which manages without a condensate purification plant.

This is achieved, according to the invention, in that, in the full-load mode, a larger quantity of water than necessary is conveyed through the economizer and the evaporator via a feed pump, the size of the water quantity being such that wet steam passes into the separation bottle, and in that the water fraction of the steam, together with all the impurities contained therein, is separated in the separation bottle and is drawn off via a clarifying line.

According to an advantageous variant, the plant is first run down to part load before the forced-flow steam generator is overfed. Overfeeding is expediently regulated in such a way that the fresh steam temperature at the outlet of the superheater corresponds to the nominal value of the respective load point.

The advantages of the invention are to be seen, inter alia, in a considerable lowering of the plant and operating costs and in the reduction of risk as a consequence of the absence of a chemical plant in the water/steam circuit.

If it is intended to clean the water/steam circuit in the full-load mode, without the system at the same time being overfed, expediently steam from a stage of incomplete evaporation is extracted out of the evaporator and is conducted into the separation bottle. In the event of heavy contamination, advantageously the entire steam quantity from this stage of incomplete evaporation is extracted and is routed into the separation bottle, whereas, in the event of low contamination, only a part quantity of steam is extracted and, together with the residual steam quantity present at the outlet of the evaporator, is conducted into the separation bottle. If effective pressure separation is desired in the separation system, it is appropriate to route the steam extracted from the stage of incomplete evaporation initially into a first startup separation bottle and from there into a following cleaning separation bottle.

In cold starting, it is appropriate to discard via the clarifying line the supercooled water passing via the evaporator into the separation bottle and, later, the water separated from the generated wet steam, until the desired purity is reached in the water/steam circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, which illustrate a plurality of exemplary embodiments of the invention, only the elements essential to understanding the invention being shown and the direction of flow of the working media being represented by arrows, and wherein:

FIG. 1 diagrammatically illustrates a combined gas/steam power plant in accordance with the present invention;

FIG. 2 illustrates a temperature/entropy diagram and;

FIG. 3 diagrammatically illustrates a portion of the embodiment according to FIG. 1 including a second embodiment of the separation bottle.

DESCRIPTION OF THE PREFERRED EMBODIMENT

Referring now to the drawings, wherein like reference numerals designate identical or corresponding parts throughout the several views, in FIG. 1, in the gas turbine system, fresh air sucked in via a line 1 is compressed to the working pressure in a compressor 2. The compressed air is strongly heated in a combustion chamber 3 fired, for example, with natural gas, and the fuel gas thus obtained is expanded in a gas turbine 4 so as to produce a work output. The energy recovered at the same time is transmitted to a generator 5 or the compressor 2. The still hot waste gas from the gas turbine is supplied via a line 6 from the outlet of the gas turbine to a waste-heat steam generation plant 7 and, after discharging its heat, is conducted out of the latter into the open via a line 8 and a chimney (not shown).

In the water/steam circuit, a multi-housing steam turbine 9, 10 and 11 is arranged on the same shaft as the gas turbine. The working steam expanded in the low-pressure turbine 11 condenses in a condenser 13. The condensate is conveyed directly into the steam generator 7 by means of a condensate pump 14. It is notable that the plant has no low-pressure economizers, feed water tanks and high-pressure economizers which are all, as a rule, heated by means of extracted steam.

The waste-heat steam generation plant 7 is designed as a vertical boiler, and, in the present case, works according to a dual-pressure steam process. A horizontal boiler could, of course, also be used.

The low-pressure system is designed as a circulating system with drum, a once-through circulating system having been selected here. It is composed, in the flue gas path of the boiler, of a low-pressure economizer 15, into which the condensate is introduced, of a low-pressure evaporator 16, and of a low-pressure superheater 19. The low-pressure evaporator is connected to a drum 17 via a circulating pump 18. The superheated steam is transferred via a low-pressure steam line 28 into a suitable stage of the medium-pressure steam turbine 10.

The high-pressure system is designed as a once-through forced-flow system and can consequently be rated both for subcritical and for supercritical parameters. It is composed, in the flue gas path of the boiler, essentially of the high-pressure economizer 21, of the high-pressure evaporator 22 and of the high-pressure superheater 23. The working medium is supplied to the high-pressure economizer 21 from the low-pressure drum 17 via a high-pressure feed pump 20. The feed water tank conventional hitherto can thereby be dispensed with. The superheated steam is transferred via a fresh steam line 24 into the high-pressure part 9 of the steam turbine.

Provided for phase separation is a separation bottle 25, into which the outlet of the high-pressure evaporator 22 opens via a line 31. The separation bottle is connected at its upper end to the high-pressure superheater 23 via a line 32. At its lower end, it is additionally provided with a clarifying line 29. A recirculation line 26 likewise extends from the lower end of the separation bottle, said recirculation line containing a shutoff member 30 and opening into the low-pressure drum 17.

After part expansion in the high-pressure part 9 of the turbine, the steam is intermediately superheated before transfer into the medium-pressure turbine 10. This intermediate superheating takes place, in the example, in heat exchange surfaces 27 which are arranged in the flue gas path of the steam generator above the high-pressure superheater 23.

By varying the pressures and mass flows in the circulating system and in the forced-flow system, a wide range of combined processes can be covered by means of such a steam generator.

Steam production commences in the boiler when the respective boiling temperatures are reached. The first steam in the low-pressure system is generated as a result of the expansion of recirculated high-pressure saturated water from the separation bottle.

The separation bottle ensures that the high-pressure superheater remains dry at all times and that superheated steam is available early at the boiler outlet. As soon as the pressure necessary for stable operation is reached in the high-pressure evaporator, the fresh steam can be used for starting up the steam turbine in the sliding pressure mode.

According to the invention, then, a condensate purification plant is to be dispensed with. This is based on the consideration that the impurities in the steam/water circuit can be drawn off in the region of the separation bottle.

The cleaning of the steam/water circuit can be carried out both under full load and under part load. Under full load, the high-pressure system is overfed, that is to say a larger quantity of water than necessary is conveyed through the once-through forced-flow steam generator via the high-pressure feed pump. It goes without saying that, in the case of a single high-pressure feed pump, the latter has to be made correspondingly larger for the extra quantity. If the plant is provided with pump redundancy, for example in the form of 2×100% or 3×50%, the replacement pump can be used for overfeeding.

The conveyed water quantity is set in such a way that, at all events, wet steam passes into the bottle. The impurities are bound in the water droplets of the water/steam mixture. In the bottle, the water fraction of the steam is separated by suitable means and is drawn off via the clarifying line 29. An advantage of this method is that the circuit is largely freed of impurities even after only a few passes, that is to say within an extremely short period of time.

In a variant in which the circuit cleaning can be carried out by means of the feed pump dimensioned for normal operation, the steam generator is run back from full load to part load, for example 80%. Thereafter, as in the full-load method, the high-pressure system is overfed and the procedure is the same as in the method described above.

Since the efficiency of a water/steam circuit depends decisively on the fresh steam temperature, it is expedient, if possible, to maintain this temperature unchanged, as far as possible, even during the cleaning operation. The overfeeding and consequently the moisture passing into the separation bottle must therefore be regulated in such a way that, under any operating load, the saturated steam quantity flowing off from the separation bottle to the superheater can still be superheated to the fresh steam temperature associated with the corresponding load point. This is based on the following consideration:

During normal operation, slightly superheated steam passes into the separation bottle, which thus remains dry. No water is drawn off. By continuously increasing the overfeeding of the steam generator system, that is to say by increasing the mass flow of feed water, superheating initially falls off. The fresh steam temperature drops. When the wet steam zone is reached, moisture is increasingly separated in the separation bottle. The mass flow arriving at the superheater decreases. As a result of the consequently decreasing steam-side load on the superheater, the fresh steam temperature once again begins to rise to the original value.

In FIG. 2, a temperature/entropy diagram shows the symbolic arrangement of the separation bottle 25 during the cleaning phase. In the wet steam phase, moisture is drawn off from the separation bottle between the points A and B.

In conclusion, it emerges that, during normal operation, the separation bottle 25 is dry, whereas, for cleaning under full load or part load, wet steam has to pass into the bottle. According to the method described above, the necessary moisture passes into the bottle by overfeeding the system, this being achieved by increasing the mass flow of feed water and/or by cutting back the gas turbine. It is undeniable that this cleaning procedure provides some additional conditions. Mention must be made of the relevant necessary regulation of the feed pump or gas turbine, the lowering and re-increasing of the fresh steam temperature and, if appropriate, the cutting back of the plant to part load. In the case of full-load cleaning, in particular, an increased feed pump capacity is necessary.

This is remedied by a method which, in the full-load mode, works without any overfeeding of the system. It involves multistage feeding of the separation bottle 25 or else feeding of multistage separation bottles connected in series.

FIG. 1 shows the first-mentioned method. The evaporator 22 is divided at a suitable point, that is to say provided with an additional header. A line 33 branches off from this header and opens into the line 31 leading to the separation bottle 25. Of course, the line 33 could also be led directly into the bottle 25. A valve 34, 35 is arranged in each of the two lines 31 and 33. A suitable point means, in the present case, that the steam drawn off there is not completely evaporated and should still have a moisture content of at least 10–15%. Such a plant is operated as follows:

During starting and in normal operation, the valve 34 is open. The valve 35 is closed. The line 31 to the bottle 25 is loaded only by water or steam which have flowed through the evaporator 22 completely.

In the case of part-quantity cleaning in the full-mode load, this procedure being selected when there is only low contamination, the valve 34 is completely open and the valve 35 is partially open. The moist steam, which is drawn off via the line 33 and which contains the impurities, is precipitated in the bottle 25. The precipitate is discharged via the clarifying line 29. In this method, the residual steam loading the lower evaporator part is reliably superheated.

In the case of full-flow cleaning in the full-load mode, this procedure being selected when there is heavy contamination, the valve 34 is closed and the valve 35 is open. The entire steam quantity travels round the lower part of the evaporator 22 and is thus routed in the moist state into the separation bottle 25, in which the separation and precipitation of the impurities take place.

FIG. 3 shows the second-mentioned method. Functionally identical elements are provided with the same reference numerals as in FIG. 1. The steam extracted from a stage of incomplete evaporation is initially led via the line 33 into a so-called startup separation bottle 125 and from then to the actual cleaning separation bottle 25. Part-quantity cleaning and full-flow cleaning are carried out in the same way as described above, in each case both bottles 125 and 25 being in operation and having the flow passing through them in succession. It goes without saying that, depending on requirements, which may depend on the power station type, on the output, on the boiler design, on the throughflow, on the arrangement of heat exchange surfaces, etc., any number of steam extractions can be used in the evaporator and separation bottles.

A particular problem is presented by the cold starting of such a plant without a condensate purification device. After a lengthy stoppage, at least virtually complete cooling or even preservation, impurities in the water/steam circuit are particularly high. This may be the result of preservatives, of contamination caused on the occasion of repair measures, of shutdown corrosion or of material flaking caused by nonstationary thermal and compressive stresses. Cold-start cleaning therefore has to be carried out particularly carefully and has the purpose of preparing the plant for continuous operation.

If the quality of condensate and feedwater does not conform to the values predetermined by international standards, the plant is started up as follows:

The supercooled water or saturated water passing into the separation bottle 25 via the evaporator 22 is not recirculated via the line 26, but is discarded proportionately or completely via the clarifying line 29. With further startup, wet steam passes into the separation bottle 25. If the quality of condensate, feedwater and steam does not yet conform to the desired values, the water, entering the separation bottle in the form of moisture/wet and largely separated therein, is still not recirculated, but is discarded proportionately or completely via the clarifying line 29. If it subsequently becomes clear that, during further loading and even until the separation bottle runs dry, a quality of condensate, feedwater and steam predetermined by the international standards is still not yet reached, cold starting is held in a state expedient according to the contamination, namely a state of pressure and moisture in the separation bottle. No further loading takes place. There is a wait at this holding point and cleaning is carried out, that is to say separated water is clarified off, until the desired purity of the water/steam circuit is reached.

In this case, a particularly beneficial effect on the separation of impurities in the separation bottle is exerted by the fact that during starting, that is to say under an extremely low part load, the pressures, heat flows and velocities, at least as regards the water, are low. Quasistationary conditions prevail. The low values influence the distribution coefficient in a way which is advantageous for separation. This distribution coefficient is defined as the ratio of the concentration of impurities in the steam phase and in the water phase at the inlet into the separation bottle. This ratio is closely dependent on the pressure, on the dynamics of the evaporation process, that is to say the possibility of the establishment of chemical equilibria, and on the impurities themselves. With a rising pressure, the numerical value of the distribution coefficient increases, that is to say the upgrading in the water falls off. The steam purity achievable at the outlet of the separation bottle is dependent on this distribution coefficient and on the clarifying rate. The lower the distribution coefficient and therefore the lower the pressure on the separator, the higher the steam purity becomes, and vice versa.

Only when the desired purity of the water/steam circuit is reached is the start up operation continued, whereupon the separation bottle is finally run dry.

This highly efficient cold-start cleaning makes it possible, in the long term, to avoid further cleaning during operation. Moreover, since the number of cold starts of a plant is limited in comparison with warm starts or hot starts per year, the start up time during cold starting is unimportant. The discarding of water according to this method is the unequivocally more cost-effective variant in comparison with chemical cleaning. In a combined power station, a water quantity to be discarded of approximately 30 $m^3$ is to be expected.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for cleaning the water/steam circuit of a combined gas/steam power plant which has a gas turbine circuit and a steam turbine circuit, the waste gases from a gas turbine transmitting their residual heat to a steam turbine via the working medium flowing in a once-through forced-flow steam generator, said once-through forced-flow steam generator comprising an economizer an evaporator, and a superheater, and a separation bottle connected between said evaporator and said superheater, comprising the steps:

conveying a larger quantity of water than necessary in a full-load mode through said economizer and said evaporator via a feed pump, the quantity of water being selected such that wet steam passes into said separation bottle;

separating the water fraction of the steam, together with all the impurities contained therein, in said separation bottle; and drawing off said water fraction together with said impurities via a clarifying line.

2. A method for cleaning the water/steam circuit of a combined gas/steam power plant which has a gas turbine circuit and a steam turbine circuit, the waste gases from a gas turbine transmitting their residual heat to a steam turbine via the working medium flowing in a once-through forced-flow steam generator, said once-through forced-flow steam generator comprising an economizer, an evaporator, and a superheater, and a separation bottle connected between said evaporator and said superheater, comprising the steps:

conveying a larger quantity of water than necessary in a part-load mode through said economizer and said evaporator via a feed pump, the quantity of water being selected such that wet steam passes into said separation bottle;

separating the water fraction of the steam, together with all the impurities contained therein, in said separation bottle; and drawing off said water fraction together with said impurities via a clarifying line.

3. The method according to claim 1, further comprising the step of regulating the water quantity conveyed via said feed pump such that the fresh steam temperature at the outlet of said superheater, after falling briefly, is automatically set to the nominal value at the respective load point.

4. A method for cleaning the water/steam circuit of a combined gas/steam power plant which has a gas turbine circuit and a steam turbine circuit, the waste gases from a gas turbine transmitting their residual heat to a steam turbine via the working medium flowing in a once-through forced-flow steam generator, said once-through forced-flow steam generator comprising an economizer, an evaporator, and a superheater, and at least one separation bottle connected between said evaporator and said superheater comprising the steps:

extracting steam from at least one stage of incomplete evaporation in an at least approximately full-load mode out of said evaporator; and leading said extracted stream into said at least one separation bottle.

5. The method according to claim 4, wherein, in the event of heavy contamination, said extracting step comprises extracting the entire steam quantity from said at least one stage of incomplete evaporation.

6. The method according to claim 4, wherein, in the event of low contamination, said extracting step comprises extracting only a part quantity of steam from said at least one stage of incomplete evaporation; and said step of leading said extracted steam further comprises leading said extracted steam together with the residual steam quantity present at an outlet of said evaporator into said at least one separation bottle.

7. The method according to claim 4, wherein said step of leading said extracted steam further comprises leading said steam extracted from said at least one stage of incomplete evaporation first into a start up separation bottle and followed by leading said extracted steam into said cleaning separation bottle.

8. A method for cleaning the water/steam circuit of a combined gas/steam power plant which has a gas turbine circuit and a steam turbine circuit, the waste gases from a gas turbine transmitting their residual heat to a steam turbine via the working medium flowing in a once-through forced-flow steam generator, said once-through forced-flow steam generator comprising an economizer, an evaporator, and a superheater, and a separation bottle connected between said evaporator and said superheater, comprising the steps:

passing supercooled water during cold startup via said evaporator into said separation bottle;

discarding said supercooled water from said separation bottle at least proportionately via a clarifying line;

separating in said separator bottle water containing impurities, said water being from wet steam generated during further start up in said evaporator;

discarding said separated water from said separation bottle at least proportionately via said clarifying line;

if contamination is still present in said combined gas/steam power plant, optionally further comprising the step of interrupting the runup of said plant and maintaining said separation bottle in a pressure and moisture state corresponding to the contamination, the separated water being discarded in the bottle until the desired purity in the water/steam circuit is reached; and repeating the preceding steps until said separation bottle runs dry.

* * * * *